Aug. 21, 1962 K. E. G. BRACEY ET AL 3,049,880
POWER OUTPUT FUEL CONTROL MEANS FOR PLURAL ENGINES
Filed Aug. 9, 1960 3 Sheets-Sheet 3
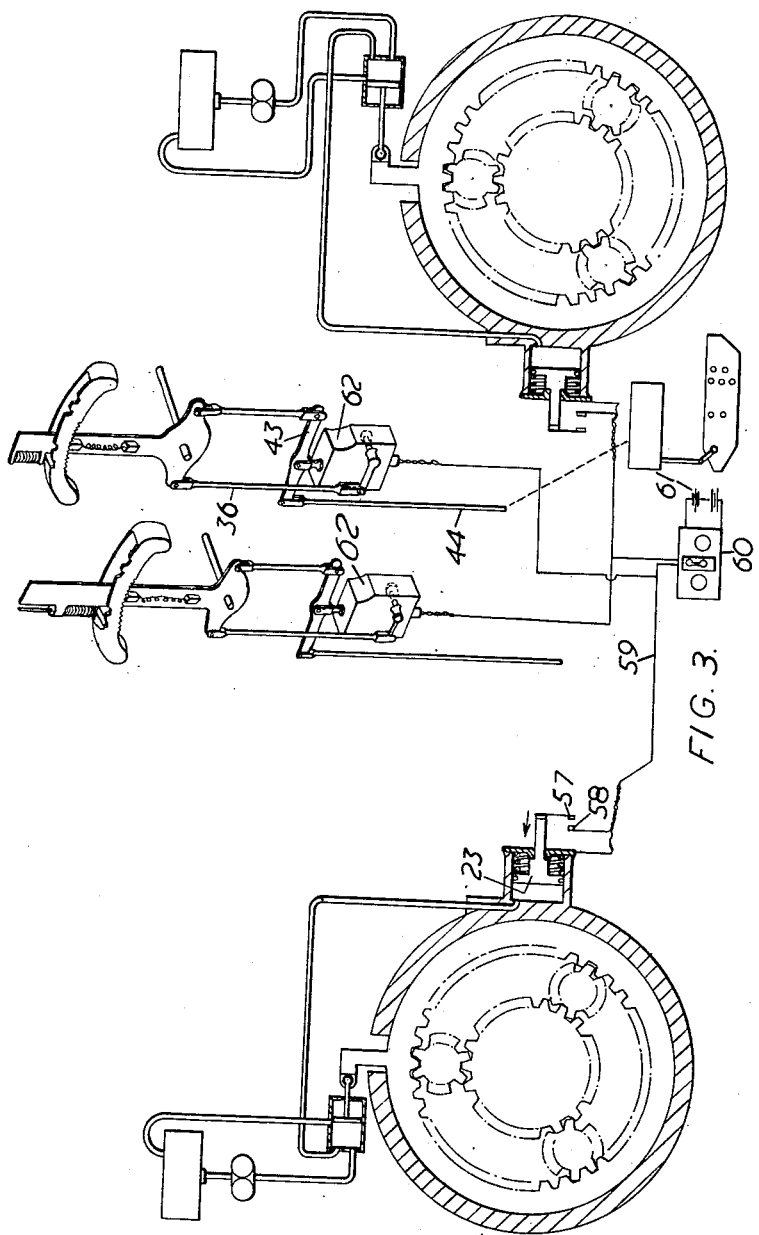
Kenneth Edward George Bracey
James Alexander Petrie
Inventors
By Cushman, Darby & Cushman
Attorneys

United States Patent Office 3,049,880
Patented Aug. 21, 1962

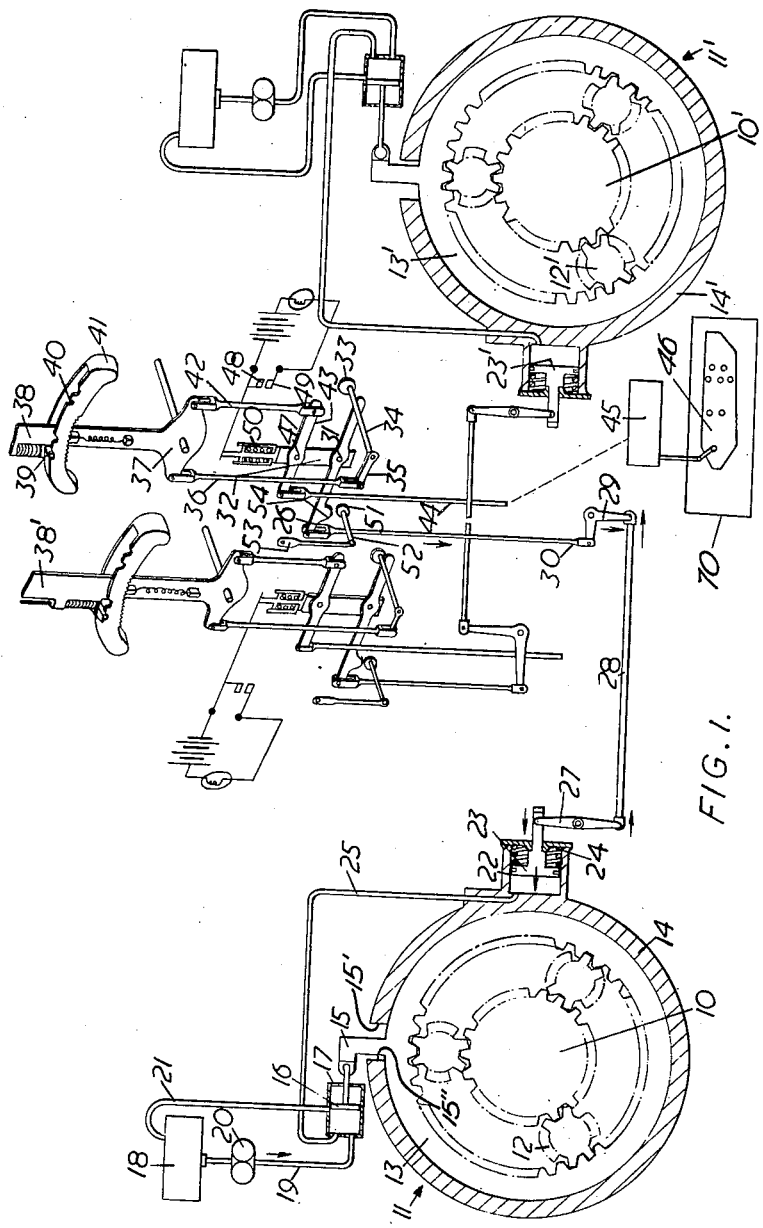

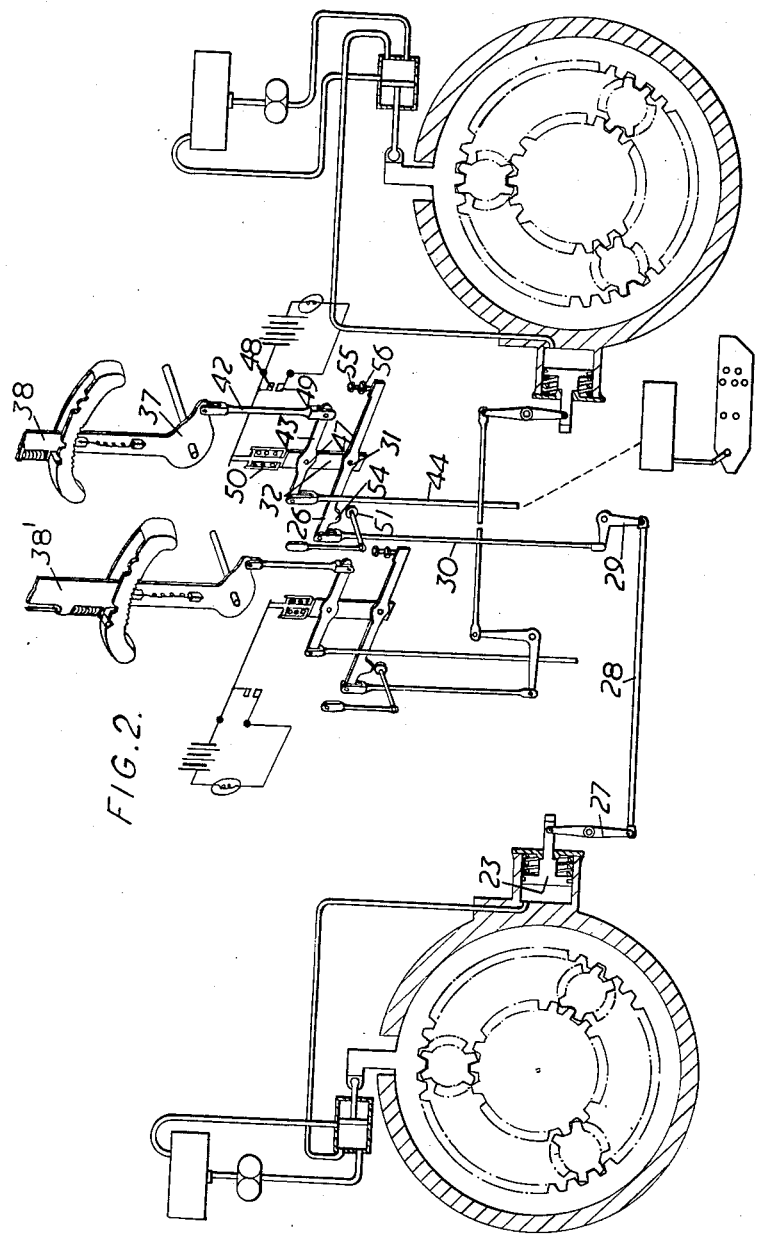

3,049,880
POWER OUTPUT FUEL CONTROL MEANS FOR PLURAL ENGINES
Kenneth Edward George Bracey, Findern, and James Alexander Petrie, Littleover, Derby, England, assignors to Rolls-Royce Limited, Derby, England, a company of Great Britain
Filed Aug. 9, 1960, Ser. No. 48,492
Claims priority, application Great Britain Aug. 10, 1959
8 Claims. (Cl. 60—39.15)

This invention concerns a power plant e.g. for use on an aircraft. Although the invention is not so restricted, the invention is of particular use on an aircraft having turbo-propeller engines.

Broadly, the invention concerns a power plant, e.g. for use on an aircraft, comprising a plurality of engines and fuel supply adjustment means which when the power of one of the engines falls below a predetermined value, adjusts the fuel supply to at least one other engine of the power plant.

Preferably, when the power of one of the engines falls below the said predetermined value, the fuel supply adjustment means increases the fuel supply to at least one other engine of the power plant.

In its preferred form, the invention comprises a power plant, e.g. for use on an aircraft, comprising two engines, a torque responsive device for each engine which is adjusted in response to the torque developed thereby, and a fuel supply means for each engine which is associated with the torque responsive device of the other engine so that, when the power of one engine falls below a predetermined value, the fuel supply to the other engine is increased.

Preferably each engine is provided with a fuel control member for adjusting the fuel supply means of the respective engine, the fuel control member of each engine being connected to its respective fuel supply means by a linkage which is adjustable by the torque responsive device of the other engine.

The position of the fuel control member (which may be constituted by an aircraft fuel trim lever) may, if desired, control the extent to which the linkage is adjustable by the torque responsive means of the other engine.

Each linkage may comprise a lever whose position is controlled in part by the position of the respective fuel control member and in part by the torque responsive device of the other engine.

Thus the position of one end of the lever may be determined by the setting of the respective fuel control member, the position of the fulcrum of the lever being controlled by the torque responsive device of the other engine. For this purpose, each linkage may comprise a second lever whose fulcrum is connected to that of the respective first-mentioned lever, one end of each second lever being engageable with an abutment and the position of its other end being controlled by the torque responsive means of the other engine.

Means associated with each said linkage may be provided for preventing movement thereof by the torque responsive means of the other engine.

Each torque responsive device preferably comprises the annulus gear of an epicyclic gear train whose sun gear is driven by the respective engine, and whose planet carrier provides the output drive from the engine, the annulus gear being mounted for limited movement.

If desired, each linkage may be adjustable by means of an electric motor which is energised on adjustment by the torque responsive device of the other engine.

The invention also comprises an aircraft provided with the above-mentioned power plant. In this case, the engines would normally be turbo-propeller engines.

The invention is illustrated, merely by way of example, in the accompanying drawings in which:

FIGURE 1 is a diagrammatic representation of a power plant according to the present invention,
FIGURE 2 is a view similar to FIGURE 1 but showing a modified power plant, and
FIGURE 3 illustrates yet a further modification.

Referring first to the power plant of FIGURE 1, a twin engined aircraft (not shown) is provided with a first turbo-propeller engine (not shown) which drives a sun gear 10 of an epicyclic gear train 11, and a second turbo-propeller engine shown schematically at 70 which drives a sun gear 10' of an epicyclic gear train 11'. The epicyclic gear trains 11, 11' comprise planet gears 12, 12' respectively and annulus gears 13, 13' respectively.

The planet gears 12, 12' are mounted on planet carriers (not shown) which drive the propellers (not shown) of the engines. The annulus gears 13, 13' are mounted for limited rotary movement within cylindrical casings 14, 14' respectively.

The annulus gear 13 has an arm 15 extending radially of the casing 14, and projecting through an aperture therein, the faces of the aperture limiting the range of movement of the annulus gear 13. A piston 16, working in an hydraulic cylinder 17, is pivotally connected to the arm 15.

An hydraulic reservoir 18 is connected to the cylinder 17 by a conduit 19. A gear pump or other pump 20 is provided in the conduit 19 to pump hydraulic liquid from the reservoir 18 to the cylinder 17. The cylinder 17 is also connected to the reservoir 18 by a return pipe 21 the flow through which is controlled by the position of the piston 16.

The casing 14 is provided with a boss constituting a cylinder 22. Within the cylinder 22 is a piston 23 acted on by a spring 24. The left hand end (as seen in the drawings) of cylinder 22 is connected to the left hand end of cylinder 17 by a pipe 25. The space to the right of the piston 23 merely contains air but it may, if desired, be vented.

The piston 23 is connected by a linkage to a lever 26, the said linkage comprising a lever 27, link 28, bell-crank lever 29, and link 30.

The lever 26 is fulcrumed at 31 on a movable plate 32, one arm of the lever 26 being movable by the link 30 and the other arm being engageable with a cam 33 mounted on a rotatable shaft 34.

Rotation of the shaft 34 is effected via an arm 35 which is connected by a link 36 to one end of a pivotally mounted cross piece 37. The cross piece 37 forms part of a T-shaped aircraft fuel trim lever 38 having a spring-pressed detent 39 engagable in various slots 40 in a housing 41. The fuel trim lever 38 is thus movable from the maximum fuel supply position shown in FIGURE 1 to a minimum fuel supply position (not shown), such movement controlling the fuel supply to the said second engine.

The end of the cross piece 37 remote from the link 36 is connected by way of a link 42 to one end of a lever 43 whose other end is connected by a linkage 44 to a fuel supply adjustment device 45. The latter controls the fuel supply to the burners 46 of the said second engine.

The lever 43 is fulcrumed at 47 on the movable plate 32 and the plate 32 carries a movable contact 48 which is engagable with a fixed contact 49 but is normally spaced therefrom by a spring 50 which urges the plate 32 toward a datum position. The contacts 48, 49 constitute a micro-switch which is disposed in an electrical circuit containing a warning device such as a lamp.

A cam 51 is mounted on a rotatable shaft 52. A handle 53 is provided for rotating the cam 51 between the position shown, in which the cam 51 is spaced from an abutment 54, and a position in which the cam 51 engages the abutment 54 so as to prevent movement of the lever 26, the force inserted by the spring 50 on plate 32 being sufficient to maintain the plate 32 in its datum position against the force exerted on it due to the turning action of lever 26 about cam 51 caused by the force transmitted to the lever 26 from the spring 24.

The said first engine is provided with a fuel trim lever 38' which is connected to a piston 23' of the second engine (corresponding to the piston 23) by means which will not be described in detail since they are a duplicate of those described above.

As stated above, the annulus gear 13 is mounted for limited movement, means (not shown) being provided for urging the annulus gear, when the torque of the first engine is below a predetermined value, toward one limit 15' of its range of movement so that the piston 16 occupies a position such that the pressure in the space to the left of the piston 16 is at a minimum, i.e., with piston 16 to the right of the connection of pipe 21 to cylinder 17 so that the pressure to the left of piston 16 is vented. The pressure in pipe 25 is therefore at a minimum and is insufficient to overcome the force of spring 24, so that the latter moves piston 23 to its left hand position.

In operation, so long as the first engine is operating normally, i.e., its torque is above said predetermined value, the annulus gear 13 is maintained by the reaction from the epicyclic gear train 11 in a fixed position at the limit 15" of its range of movement opposite said one limit 15'. In this position, the pressure to the left of piston 16, and hence to the left of piston 23, will be at a maximum, and is sufficient to overcome the force of the spring 24 so that the piston 23 occupies its right hand position.

However, should the first engine fail, the annulus gear 13 will move to said one limit 15' of its range of movement so as to reduce pressure to the left of each of the pistons 16, 23. The spring 24 will therefore urge the piston 23 to the left (as viewed in FIGURE 1) so as to move the link 30 axially vertically downward. Assuming that the cam 51 is then spaced from the abutment 54, movement of the link 30 will cause the lever 26 to bear against the cam 33. The position of the cam 33 will, of course, be fixed for any given position of the fuel trim lever 38 of the second engine. The engagement of the lever 26 with the cam 33 thus causes movement of the plate 32, the extent of such movement depending upon the angular position of the cam 33.

Movement of the plate 32 will alter the position of the fulcrum 47 and since the end of the lever 43 which is connected to the link 42 is fixed for any given setting of the lever 38, movement of the fulcrum 47 will cause movement of the linkage 44 and consequently increase of the fuel supply to the second engine. At the same time the micro-switch 48, 49 will close so that the warning device will indicate to the pilot the failure of the first engine.

It will be noted that the extent to which the fuel supply to the second engine is increased depends on the position of the cam 33 and hence of the lever 38. This arrangement enables the optimum amount of fuel enrichment to be chosen for contingency purposes, consistent with the temperature limitations of the engine.

It will be appreciated that when the cam 51 is rotated by the handle 53 into the position in which it engages the abutment 54, the linkage 30 will be maintained still against the force of spring 24 so that failure of the first engine will not result in the increase of the fuel supply to the second engine.

FIGURE 2 illustrates a power plant generally similar to that of FIGURE 1 except that the parts 33—36 are omitted and the end of the lever 26 remote from the link 30 is engageable with an abutment constituted by an adjusting screw 55 which is threaded through fixed structure 56.

In the FIGURE 2 arrangement therefore the total fuel which is supplied to one engine on the breakdown of the other is fixed in amount to give the maximum flow which the fuel unit is capable of passing, provided the ambient day temperature does not exceed a predetermined value. Beyond this day temperature, the total contingency flow will be reduced according to the position of the fuel trim lever, in order to avoid overheating the turbine. The FIGURE 2 construction is, however, a generally satisfactory one since the additional fuel which is required on breakdown of an engine does not vary within very wide limits.

The screw 55 is therefore normally set in a position which is reasonably satisfactory for any setting of the fuel trim levers.

FIGURE 3 will not be described in detail since its construction is similar to that of FIGURES 1 and 2 except that the piston 23 is connected to the lever 43 and linkage 44 by an electrical instead of a mechanical connection.

In the FIGURE 3 construction the piston 23 carries a contact 57 which may be moved into and out of contact with a fixed contact 58. The contacts 57, 58 constitute a micro-switch which is disposed in a circuit 59 which incorporates a control switch 60, current source 61, and electric motor 62. Closing of the microswitch 57, 58 as a result of movement of the piston 23 following failure of the first engine, causes energisation of the motor 62. This serves to adjust the lever 43 and linkage 44. The motor continues to operate until a limit switch (not shown) stops further operation of the motor, the limit switch having one contact carried by the link 36.

Preferably in each of the systems described means is incorporated to ensure that individual engines can be run upon the ground without interference from "dead" engines. This can be done simply by means of the cam 51 which will baulk the mechanism and so invalidate the arming action of a fully open throttle lever when on the ground.

It is also advisable to arm the system so that it is operative for take-off only. This can be done by means of a movable stop, preferably in the form of a cam, linked to the throttle lever to prevent operation of the emergency device unless the throttles are nearly fully open.

A system of cables and pulleys can be used as alternatives to the mechanical linkages described with reference to FIGURES 1 and 2 of the drawings.

We claim:

1. A control system for use with a power plant which includes two engines, comprising first and second engine-torque-responsive devices, first and second fuel control members, first and second primary levers connected to and movable by said first and second fuel control members respectively, first and second fuel supply means, first and second linkages connecting, respectively, said first primary lever to said first fuel supply means so that movement of the same by said first fuel control member controls fuel to said first fuel supply means and said second primary lever to said second fuel supply means so that movement of the same by said second fuel control member controls fuel to said second fuel supply means, first and second secondary levers having fulcrums which are connected, respectively, to fulcrums of said first and second primary levers, adjustable first and second abutment means with which said second and first secondary levers, respectively, are engageable, first and second operative connecting means connecting, respectively, said first torque-responsive device to said second secondary lever and said second torque-responsive device to said first secondary lever, said first torque-responsive device serving, when the torque to which it responds falls below a predetermined value, to operate said first operative connecting means and said second secondary lever so that the latter abuts said first abutment means and adjusts the position of the fulcrum of the second primary lever by an amount depending on the adjustment of the first abutment means, whereby the second primary lever adjusts said second linkage independent of movement of said second fuel control member to increase the fuel supply from said second fuel supply means, and said second torque-responsive device serving when the torque to which it responds falls below a predetermined value to operate said second operative connecting means and said first secondary lever so that the latter abuts said second abutment means and adjusts the position of the fulcrum of the first primary lever by an amount depending on the adjustment of the second abutment means, whereby the first primary lever adjusts said first linkage independent of movement of said first fuel control member to increase the fuel supply from said first fuel supply, said first and second abutment means being so arranged that the fuel supply from both said fuel supply means is maintained below a maximum safe value.

2. A control system for use with a power plant which includes two engines, comprising first and second engine-torque-responsive devices, first and second fuel control members, first and second primary levers connected, respectively, to said first and second fuel control members, first and second fuel supply means, first and second linkages connecting, respectively, said first primary lever to said first fuel supply means and said second primary lever to said second fuel supply means, first and second secondary levers having fulcrums which are connected, respectively, to fulcrums of said first and second primary levers, adjustable first and second abutment means with which said second and first secondary levers, respectively, are engageable, said first and second abutment means being respectively adjustable by said second and first fuel control members, first and second operative connecting means connecting, respectively, said first torque-responsive device to said second secondary lever and said second torque-responsive device to said first secondary lever, said first torque-responsive device serving, when the torque to which it responds falls below a predetermined valve, to operate said first operative connecting means and said second secondary lever so that the latter abuts said first abutment means and adjusts the position of the fulcrum of the second primary lever by an amount depending on the adjustment of the first abutment means, whereby the second primary lever adjusts said second linkage to increase the fuel supply from said second fuel supply means, and said second torque-responsive device serving when the torque to which it responds falls below a predetermined value to operate said second operative connecting means and said first secondary lever so that the latter abuts said second abutment means and adjusts the position of the fulcrum of the first primary lever by an amount depending on the adjustment of the second abutment means, whereby the first primary lever adjusts said first linkage to increase the fuel supply from said first fuel supply, said first and second abutment means being so arranged that the fuel supply from both said fuel supply means is maintained below a maximum safe value.

3. A control system as claimed in claim 2 in which said first and second engine-torque-responsive devices each comprises an annulus gear which is rotatable over a limited range and is biased toward one end of said range, the torque to which the torque-responsive device is responsive urging the annulus gear to the other end of said range when it exceeds said predetermined value, and allowing the annulus gear to move toward said one end of said range when it falls below said predetermined value.

4. A control system as claimed in claim 2 in which each of said operative connecting means includes a hydraulic servo-motor controlled by the respective torque-responsive device and connected by a mechanical linkage to the respective secondary lever.

5. A control system as claimed in claim 2 in which each of said operative connecting means includes an electric motor controlled by the respective torque-responsive device and drivingly connected to the respective secondary lever.

6. A control system for use with a power plant which includes two engines, comprising first and second engine-torque-responsive devices, first and second fuel control members, first and second primary levers having fulcrums located intermediate their ends, said first and second primary levers being connected at one of their ends to said first and second fuel control members respectively, first and second fuel supply means, first and second linkages connecting, respectively, the opposite end of said first primary lever to said first fuel supply means and the opposite end of said second primary lever to said second fuel supply means, first and second secondary levers having fulcrums intermediate their ends which are connected, respectively, to fulcrums of said first and second primary levers, adjustable first and second abutment means respectively engageable with one end of said second and first secondary levers, first and second operative connecting means connecting, respectively, said first torque-responsive device to the opposite end of said second secondary lever and said second torque-responsive device to the opposite end of said first secondary lever, said first torque-responsive device serving, when the torque to which it responds falls below a predetermined value, to operate said first operative connecting means and said second secondary lever so that the latter abuts said first abutment means and adjusts the position of the fulcrum of the second primary lever by an amount depending on the adjustment of the first abutment means, whereby the second primary lever adjusts said second linkage to increase the fuel supply from said second fuel supply means, and said second torque-responsive device serving when the torque to which it responds falls below a predetermined value to operate said second operative connecting means and said first secondary lever so that the latter abuts said second abutment means and adjusts the position of the fulcrum of the first primary lever by an amount depending on the adjustment of the second abutment means, whereby the first primary lever adjusts said first linkage to increase the fuel supply from said first fuel supply, said first and second abutment means being so arranged that the fuel supply from both said fuel supply means is maintained below a maximum safe value.

7. A control system for use with a power plant which includes two engines, comprising first and second engine-torque-responsive devices, first and second fuel control members, first and second fuel supply means, and first and second linkages connecting respectively said first fuel control member to said first fuel supply means, and said second fuel control member to said second fuel supply means, first and second operative connecting means connecting, respectively, said first torque-responsive device to said second linkage, and said second torque-responsive device to said first linkage, said first torque-responsive device serving when the torque to which it responds falls below a predetermined value to operate said first operative connecting means and said second linkage so that the latter is adjusted to increase the fuel supply from said second fuel supply means, and said second torque-responsive device serving when the torque to which it responds falls below a predetermined value to operate said second operative connecting means and said first linkage so that the latter is adjusted to increase the fuel supply from said first fuel supply means, adjustable first and second abutment means, means connecting said second and first fuel control members to said first and second abutment means respectively so that the positions of the latter are determined by the settings of the second and first fuel control members, said first and second abutment means being engageable with said first and second operative connecting means respectively, so that when the second and first fuel control members respectively are set to give increased fuel flow, said first and second abutment means reduce the amount by which said second and first linkages respectively are adjustable by said first and second operative connecting means, whereby the fuel supply from both said fuel supply means is maintained below a maximum safe value.

8. A control system for use with a power plant which includes two engines, comprising first and second engine-torque-responsive devices, first and second fuel control members, first and second fuel supply means, said first and second linkages connecting respectively said first fuel control member to said first fuel supply means, and said second fuel control member to said second fuel supply means, first and second operative connecting means connecting, respectively, said first torque-responsive device to said second linkage, and said second torque-responsive device to said first linkage, said first torque-responsive device serving when the torque to which it responds falls below a predetermined value, to transmit a predetermined amount of motion via first operative connecting means and to operate said second linkage so that the latter is adjusted to increase the fuel supply from said second fuel supply means, and said second torque-responsive device serving when the torque to which it responds falls below a predetermined value to transmit a predetermined amount of motion via said second operative connecting means and to operate said first linkage so that the latter is adjusted to increase the fuel supply from said first fuel supply means, adjustable first and second abutment means, means connecting said second and first fuel control members to said first and second abutment means respectively so that the position of the latter are determined by the settings of the second and first fuel control members, said first abutment means, in accordance with its position, permitting a predetermined amount of lost motion in said first operative connecting means prior to engaging the latter, whereafter the first operative connecting means adjusts said second linkage, and said second abutment means, in accordance with its position, permitting a predetermined amount of lost motion in said second operative connecting means prior to engaging the latter, whereafter the second operative connecting means adjusts said first linkage, said second and first fuel control members, when they are set to give increased fuel flow, adjusting the positions of said first and second abutment means so as to increase said respective predetermined amounts of lost motion, and to reduce the amount by which said second and first linkages respectively are adjustable by said first and second operative connecting means, whereby the fuel supply from both said fuel supply means is maintained below a maximum safe value.

References Cited in the file of this patent

UNITED STATES PATENTS

| | | |
|---|---|---|
| 2,912,822 | Hooker | Nov. 17, 1959 |
| 2,931,442 | Stanton | Apr. 5, 1960 |
| 2,942,416 | Buckingham | June 28, 1960 |